(12) United States Patent
Jung et al.

(10) Patent No.: US 10,622,128 B2
(45) Date of Patent: Apr. 14, 2020

(54) MAGNETIC BETA-TRICALCIUM PHOSPHATE SPHERICAL PARTICLES AND METHOD FOR PRODUCING THE SAME

(71) Applicant: RESEARCH & BUSINESS FOUNDATION SUNGKYUNKWAN UNIVERSITY, Suwon-si, Gyeonggi-do (KR)

(72) Inventors: Hyun Suk Jung, Seoul (KR); So Yeon Park, Cheongju-si (KR); Dong Geon Lee, Suwon-si (KR); Young Un Jin, Suwon-si (KR); Min Hee Kim, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 608 days.

(21) Appl. No.: 15/494,428

(22) Filed: Apr. 21, 2017

(65) Prior Publication Data
US 2017/0323709 A1 Nov. 9, 2017

(30) Foreign Application Priority Data
May 3, 2016 (KR) .................. 10-2016-0054399

(51) Int. Cl.
*C01B 25/32* (2006.01)
*H01F 1/06* (2006.01)
*C04B 35/447* (2006.01)

(52) U.S. Cl.
CPC .............. *H01F 1/061* (2013.01); *C01B 25/32* (2013.01); *C04B 35/447* (2013.01); *C04B 2235/3208* (2013.01); *C04B 2235/3272* (2013.01); *C04B 2235/44* (2013.01); *C04B 2235/443* (2013.01); *C04B 2235/444* (2013.01); *C04B 2235/447* (2013.01)

(58) Field of Classification Search
CPC ..................................................... C01B 25/32
See application file for complete search history.

(56) References Cited

U.S. PATENT DOCUMENTS

2006/0013921 A1* 1/2006 Kasahara ............... C01B 25/32
426/74

FOREIGN PATENT DOCUMENTS

KR 10-1345599 B1 12/2013
KR 10-2014-0009968 A 1/2014

OTHER PUBLICATIONS

Silva. Magnetic properties study on Fe-doped calcium phosphate. Physica Scripta, vol. 80, No. Nov. 5, 2009 (Year: 2009).*
Shu-Dong Jiang et al., Fabrication of Hydroxyapatite Hierarchical Hollow Microspheres and Potential Application in Water Treatment, J. Phys. Chem. C 2012, 116, pp. 4484-4492 (Jan. 26, 2012).

* cited by examiner

*Primary Examiner* — Matthew E. Hoban
(74) *Attorney, Agent, or Firm* — NSIP Law

(57) ABSTRACT

The present disclosure provides a method for producing beta-tricalcium phosphate spherical particles containing magnetic ions. The method includes mixing acidic amino acid monomers, metal salt of magnetic ions and metal salt of calcium ions in de-ionized water to form a first solution; dissolve phosphate in de-ionized water to form a second solution; mixing the first and second solutions to form a third solution; and performing hydrothermal synthesis of the third solution.

19 Claims, 11 Drawing Sheets

MAGNETIC BETA-TRICALCIUM PHOSPHATE SPHERICAL PARTICLES AND METHOD FOR PRODUCING THE SAME

CROSS-REFERENCE TO RELATED APPLICATION

This application claims the benefit of Korean patent application No. 10-2016-0054399 filed on May 3, 2016, the entire content of which is incorporated herein by reference for all purposes as if fully set forth herein.

BACKGROUND

Field of the Present Disclosure

The present disclosure relates to a method for producing beta-tricalcium phosphate spherical particles being magnetic, and to the magnetic beta-tricalcium phosphate spherical particles as produced using the method.

Further, the present disclosure relates to a production of beta-tricalcium phosphate spherical particles containing magnetic ions using hydrothermal synthesis, wherein the beta-tricalcium phosphate spherical particles having various magnetic properties may be produced via adjustment of atmospheres and/or temperatures of thermal treatment for the spherical particles.

BACKGROUND OF THE INVENTION

Iron oxide acts as a typical biocompatible magnetic nanoparticles, which are widely used for nuclear magnetic resonance imaging (MRI), and drug delivery for cancer treatment. The magnetic nanoparticles may be precisely targeted by applying an external magnetic field thereto. Thus, this approach has been employed for cells analysis and separation, and hyperthermia for cancer cells and selectively killing of cancer cells.

However, iron oxide nanoparticles have toxicity and are harmful against the inner body organs. Thus, the iron oxide nanoparticles have been coated with biopolymers such as poly (ethyl glycol), amino acid, DNA, and collagen, etc. which are biologically stable and biodegradable and toxicity-free. Alternatively, the iron oxide nanoparticles have been coated with bioceramics such as silicon oxide ($SiO_2$), titanium oxide ($TiO_2$), and calcium phosphate to improve the biocompatibility properties thereof.

In particular, calcium phosphate-based bioceramics such as hydroxyapatite, beta-tricalcium phosphate, and alpha-tricalcium phosphate, etc. are biocompatible materials similar to bone tissues. Thus, they have excellent biocompatibility with human body, bioactivity, and bone conduction, such that they are very suitable for bone regeneration and related cancer treatment. In addition, calcium phosphates may have varying forms such as nanospheres, nanocapsules, nanofibers and nanotubes, and may have surface properties. Further, calcium phosphates may have added strontium (Sr), iron (Fe), magnesium (Mg), and silicon (Si) ions thereto to exhibit various properties. This calcium phosphate has been widely used as a drug delivery system and a fluorescent material, etc. In addition, it has been reported that calcium phosphate having magnetic properties has improved mechanical properties, radiation impermeability and osteoblast proliferation activity.

However, in order to coat the iron oxide nanoparticles with the biomaterials, it is necessary to go through two or more synthesis, and, further, very precise control is required due to the variation of magnetic property based on coating thickness. As one example, J. KIM et al. disclose a following approach to prepare the mesoporous iron oxide ($Fe_3O_4$)/silicon oxide ($SiO_2$) core-shell structure: first, uniform-sized iron oxide ($Fe_3O_4$) is prepared in chloroform solvent; and, second, using cetyltrimethylammonium bromide (CTAB) as a surfactant, the chloroform solvent is replaced with water; third, $Fe_3O_4$@mSiO2 core-shell structure is formed by a sol-gel method; fourth, heating and refluxing are performed to remove the CTAB. In addition, it is known that the synthesized calcium phosphate having added ions thereto such as iron (Fe), cobalt (Co), and nickel (Ni) ions for magnetic property has a slight magnetic property and is practically useless.

SUMMARY OF THE INVENTION

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter.

The present disclosure is to provide a method for producing magnetic beta-tricalcium phosphate spherical particles and the magnetic beta-tricalcium phosphate spherical particles as produced using the method.

Further, the present disclosure is to provide biocompatible beta-tricalcium phosphate spherical particles having varying magnetic properties depending on atmospheres or temperatures of the thermal treatment after the synthesis thereof.

In a first aspect of the present disclosure, there is provided a method for producing beta-tricalcium phosphate spherical particles containing magnetic ions, the method comprising: mixing acidic amino acid monomers, metal salt of the magnetic ions and metal salt of calcium ions in de-ionized water to form a first solution; dissolve phosphate in de-ionized water to form a second solution; mixing the first and second solutions to form a third solution; and performing hydrothermal synthesis of the third solution.

In one implementation of the first aspect, amino acid in the acidic amino acid monomer includes at least one selected from a group consisting of aspartic acid and glutamic acid.

In one implementation of the first aspect, the method further comprises adjusting a pH of the third solution, wherein the adjusted pH thereof is in a range of 4 to 8.

In one implementation of the first aspect, the hydrothermal synthesis is carried out at a temperature of 100 to 230° C. for 6 to 24 hours.

In one implementation of the first aspect, the magnetic ions are selected from Fe, Co, or Ni ions.

In one implementation of the first aspect, the magnetic ions are Fe ions, and a molar ratio of Fe to (Fe+Ca) in the third solution is in a range of 0.1 to 0.3, and the metal salt of Fe ions includes at least one selected from a group consisting of $FeCl_2$, $FeCl_3$, $Fe(NO_3)_2$, $Fe(NO_3)_3$, $Fe(OH)_2$ and $Fe(OH)_3$.

In one implementation of the first aspect, the metal salt of calcium ions includes at least one selected from $Ca(NO_3)_2$, $CaCl_2$, $Ca(OH)_2$ and $(Ca(CH_3CO_2)_2$.

In one implementation of the first aspect, the phosphate includes at least one selected from $H_3PO_4$, $NaH_2PO_4$, $Na_2HPO_4$, $KH_2PO_4$, $K_2HPO_4$, $(NH_4)H_2PO_4$ and $(NH_4)_2HPO_4$.

In accordance with a second aspect of the present disclosure, there is provided the beta-tricalcium phosphate spherical particles containing magnetic ions, as produced using the method of the first aspect.

In accordance with a third aspect of the present disclosure, there is provided a method for producing beta-tricalcium phosphate spherical particles being magnetic, the method comprising: mixing acidic amino acid monomers, metal salt of magnetic ions and metal salt of calcium ions in de-ionized water to form a first solution; dissolve phosphate in de-ionized water to form a second solution; mixing the first and second solutions to form a third solution; performing hydrothermal synthesis of the third solution to form beta-tricalcium phosphate spherical particles containing magnetic ions; and performing thermal treatment of the beta-tricalcium phosphate spherical particles containing magnetic ions.

In one implementation of the third aspect, the thermal treatment is performed at a temperature above 600° C. inclusive under a reduction atmosphere.

In one implementation of the third aspect, the thermal treatment includes first and subsequent second thermal treatments, wherein the first thermal treatment is performed at a temperature above 600° C. inclusive under a reduction atmosphere, wherein the second treatment is performed under an oxygen atmosphere.

In one implementation of the third aspect, amino acid in the acidic amino acid monomer includes at least one selected from a group consisting of aspartic acid and glutamic acid.

In one implementation of the third aspect, the method further comprises adjusting a pH of the third solution, wherein the adjusted pH thereof is in a range of 4 to 8.

In one implementation of the third aspect, the hydrothermal synthesis is carried out at a temperature of 100 to 230° C. for 6 to 24 hours.

In one implementation of the third aspect, the magnetic ions are selected from Fe, Co, or Ni ions.

In one implementation of the third aspect, the magnetic ions are Fe ions, and a molar ratio of Fe to (Fe+Ca) in the third solution is in a range of 0.1 to 0.3.

In one implementation of the third aspect, the metal salt of Fe ions includes at least one selected from a group consisting of $FeCl_2$, $FeCl_3$, $Fe(NO_3)_2$, $Fe(NO_3)_3$, $Fe(OH)_2$ and $Fe(OH)_3$.

In one implementation of the third aspect, the metal salt of calcium ions includes at least one selected from $Ca(NO_3)_2$, $CaCl_2$, $Ca(OH)_2$ and $(Ca(CH_3CO_2)_2$.

In one implementation of the third aspect, the phosphate includes at least one selected from $H_3PO_4$, $NaH_2PO_4$, $Na_2HPO_4$, $KH_2PO_4$, $K_2HPO_4$, $(NH_4)H_2PO_4$ and $(NH_4)_2HPO_4$.

In accordance with a fourth aspect of the present disclosure, there is provided the beta-tricalcium phosphate spherical particles containing magnetic ions, as produced using the method of the third aspect.

In accordance with a fifth aspect of the present disclosure, there is provided the beta-tricalcium phosphate spherical particles containing magnetic oxides, as produced using the method of the third aspect.

According to the present disclosure, the synthesis between the magnetic ions source, the calcium ions source, the phosphate ion source and the acidic amino acid monomers preserving the spherical shape are carried out simultaneously in the hydrothermal synthesis step to synthesize beta-tricalcium phosphate spherical particles containing magnetic ions. Thus, the synthesis process may be simple and synthesis time may be shortened.

In addition, the beta-tricalcium phosphate spherical particles with magnetic properties may be synthesized via reduction and oxidation thermal treatment of the product obtained by the hydrothermal synthesis.

According to the present disclosure, the beta-tricalcium phosphate spherical particles containing magnetic ions may be synthesized via the hydrothermal synthesis, and, then, the synthesized beta-tricalcium phosphate spherical particles may be subjected to the thermal treatment together with controlling the atmosphere or temperature of the thermal treatment, such that the resulting beta-tricalcium phosphate spherical particles may have various magnetic characteristics.

The magnetic spherical particles as defined above may be employed for cell labeling, cell separation, targeted drug delivery, hyperthermia for cancer therapy, and MM imaging or may act as antibacterial agents.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

For simplicity and clarity of illustration, elements in the figures are not necessarily drawn to scale. The same reference numbers in different figures denote the same or similar elements, and as such perform similar functionality. Also, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

DETAILED DESCRIPTION OF THE INVENTION

Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entire list of elements and may not modify the individual elements of the list.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In the following description, numerous specific details are set forth in order to provide a thorough understanding of the present disclosure. The present disclosure may be practiced without some or all of these specific details. In other instances, well-known process structures and/or processes have not been described in detail in order not to unnecessarily obscure the present disclosure.

A method for producing beta-tricalcium phosphate spherical particles containing magnetic ions in accordance with one embodiment of the present disclosure includes mixing acidic amino acid monomers, metal salt of magnetic ions and metal salt of calcium ions in de-ionized water to form a first solution; dissolve phosphate in de-ionized water to form a second solution; mixing the first and second solutions to form a third solution; and performing hydrothermal synthesis of the third solution. The magnetic ions are selected from Fe, Co, or Ni ions. Hereinafter, Fe ions as magnetic ions may be exemplified to describe the present method.

Figure 1:
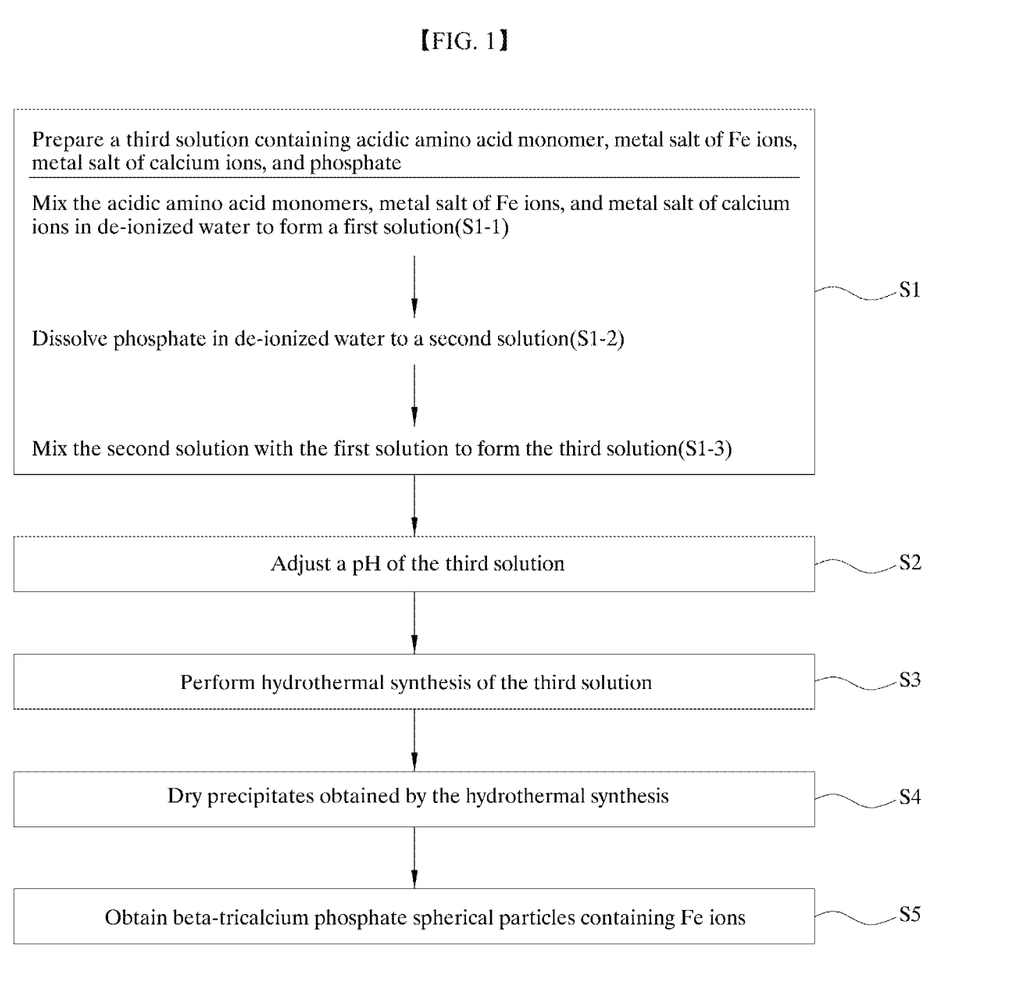
FIG. 1 shows a flow chart of a method for producing beta-tricalcium phosphate spherical particles containing Fe ions in accordance with one embodiment of the present disclosure.

FIG. 1 shows a flow chart of a method for producing beta-tricalcium phosphate spherical particles containing Fe ions in accordance with one embodiment of the present disclosure.

The method for producing beta-tricalcium phosphate spherical particles containing Fe ions in accordance with one embodiment of the present disclosure includes mixing acidic amino acid monomers, metal salt of Fe ions and metal salt of calcium ions in de-ionized water to form a first solution; dissolve phosphate in de-ionized water to form a second solution; mixing the first and second solutions to form a third solution; and performing hydrothermal synthesis of the third solution.

Referring to FIG. 1, at S1, a solution (hereinafter, third solution) containing acidic amino acid monomer, metal salt of Fe ions, metal salt of calcium ions, and phosphate is prepared. For this, first, the acidic amino acid monomers, metal salt of Fe ions, and metal salt of calcium ions are mixed in de-ionized water to form a first solution (S1-1), and, phosphate is dissolved in de-ionized water to a second solution (S1-2). Then, the second solution is mixed with the first solution to form the third solution (S1-3).

In one embodiment, the amino acid of the acidic amino acid monomer may be at least one selected from the group consisting of aspartic acid and glutamic acid.

In one embodiment, the metal salt of Fe ions may be at least one selected from the group consisting of $FeCl_2$, $FeCl_3$, $Fe(NO_3)_2$, $Fe(NO_3)_3$, $Fe(OH)_2$ and $Fe(OH)_3$.

In one embodiment, the metal salt of calcium ions may be at least one selected from $Ca(NO_3)_2$, $CaCl_2$, $Ca(OH)_2$ and $(Ca(CH_3CO_2)_2$.

In one embodiment, the phosphate may be at least one selected from $H_3PO_4$, $NaH_2PO_4$, $Na_2HPO_4$, $KH_2PO_4$, $K_2HPO_4$, $(NH_4)H_2PO_4$ and $(NH_4)_2HPO_4$.

Figure 4:
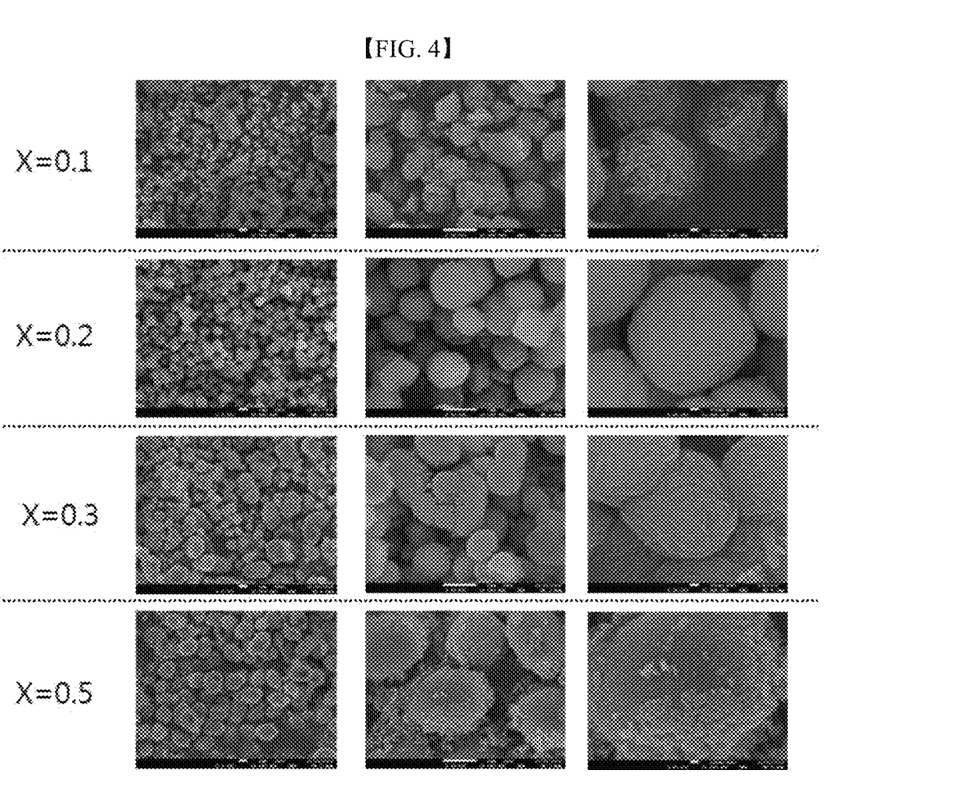
FIG. 4 shows SEM images for surfaces of beta-tricalcium phosphate spherical particles containing Fe ions based on a molar ratio of Fe to (Fe+Ca) therein, as produced in accordance with one embodiment.

In the third solution, a molar ratio of Fe to (Fe+Ca) may be in a range of 0.1 to 0.3. When the molar ratio is in a range of 0.1 to 0.3, spherical particles are obtained as shown in FIG. 4. When the molar ratio exceeds 0.3, the phase of calcium phosphate changes and further, spherical particles may not be obtained. This will be further described in conjunction with concrete experimental examples in later examples.

After the mixed solution, that is, the third solution is prepared as described above, adjusting the pH of the third solution is further performed at S2. The pH is preferably adjusted to a pH of about 4 to 8. Only within this pH range, a spherical cluster of particles of several hundred nanometers in size is obtained, wherein the cluster is formed of spherical particles of 20 to 30 nanometers in size. When the pH is outside the range of 4 to 8, nanoparticles of 20 to 30 nanometers in size thus formed are not spherical. The pH may be adjusted by using ammonia water or the like.

At S3, the third solution is subject to hydrothermal synthesis. Such hydrothermal synthesis is preferably carried out at 100 to 230° C. for 6 to 24 hours. The hydrothermal synthesis is carried out in an autoclave. The synthesis itself does not occur at temperatures below 100° C. With respect to the duration of the hydrothermal synthesis, when the duration is less than 6 hours, the yield is too low. When the duration is more than 24 hours, the yield is kept almost constant. Thus, the hydrothermal synthesis duration is preferably 6 hours to 24 hours.

Furthermore, at S4, precipitates obtained by hydrothermal synthesis are dried. Hence, at S5, beta-tricalcium phosphate spherical particles containing iron ions are obtained.

Up to now, the method for producing beta-tricalcium phosphate spherical particles containing magnetic ions has been described. Using this method, beta-tricalcium phosphate spherical particles containing Fe ions may be obtained. Such beta-tricalcium phosphate spherical particles containing magnetic ions do not yet exhibit magnetic property. Hereinafter, a heat treatment to allow the beta-tricalcium phosphate spherical particles containing magnetic ions to have magnetic property will be described. In the following description of the heat treatment, the magnetic ions will be exemplified as Fe ions.

Figure 2:
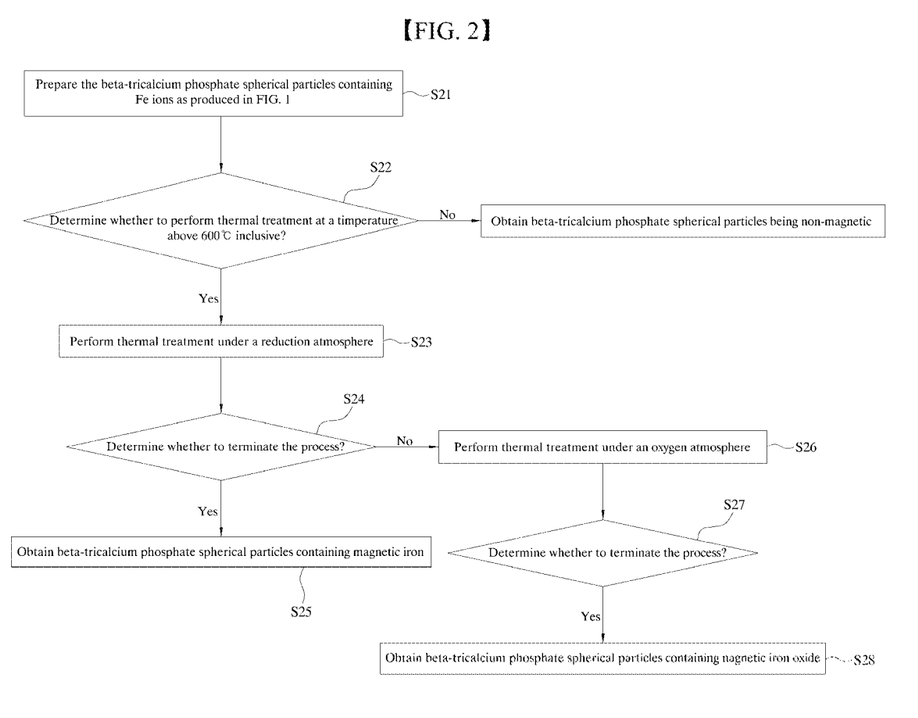
FIG. 2 shows a flow chat of a method for producing magnetic beta-tricalcium phosphate spherical particles containing iron or iron oxide in accordance with one embodiment.

FIG. 2 shows a flow chat of a method for producing magnetic beta-tricalcium phosphate spherical particles containing iron or iron oxide in accordance with one embodiment.

The method for producing magnetic beta-tricalcium phosphate spherical particles containing iron or iron oxide in accordance with one embodiment include mixing acidic amino acid monomers, metal salt of Fe ions and metal salt of calcium ions in de-ionized water to form a first solution; dissolve phosphate in de-ionized water to form a second solution; mixing the first and second solutions to form a third solution; performing hydrothermal synthesis of the third solution; and performing thermal treatment of beta-tricalcium phosphate spherical particles containing iron ions.

The operations of mixing acidic amino acid monomers, metal salt of Fe ions and metal salt of calcium ions in de-ionized water to form a first solution, dissolve phosphate in de-ionized water to form a second solution, mixing the first and second solutions to form a third solution, and performing hydrothermal synthesis of the third solution may be embodied as above described with reference to FIG. 1. Thus, hereinafter, the thermal treatment of beta-tricalcium phosphate spherical particles will be focused. FIG. 2 illustrates a thermal process of beta-tricalcium phosphate spherical particles containing Fe ions as produced as shown in FIG. 1.

Referring to FIG. 2, at S21, the beta-tricalcium phosphate spherical particles containing Fe ions as produced using S1 to S5 in FIG. 1 may be provided. At S22, it may be determined whether the beta-tricalcium phosphate spherical particles containing Fe ions may be subjected to the heat treatment at a temperature above 600° C. inclusive. Upon determination that or when the beta-tricalcium phosphate spherical particles containing Fe ions is not subjected to the heat treatment at a temperature above 600° C. inclusive, or is subject to the heat treatment at a temperature below 600° C., the beta-tricalcium phosphate spherical particles containing Fe ions may not exhibit magnetic property.

Figure 10:
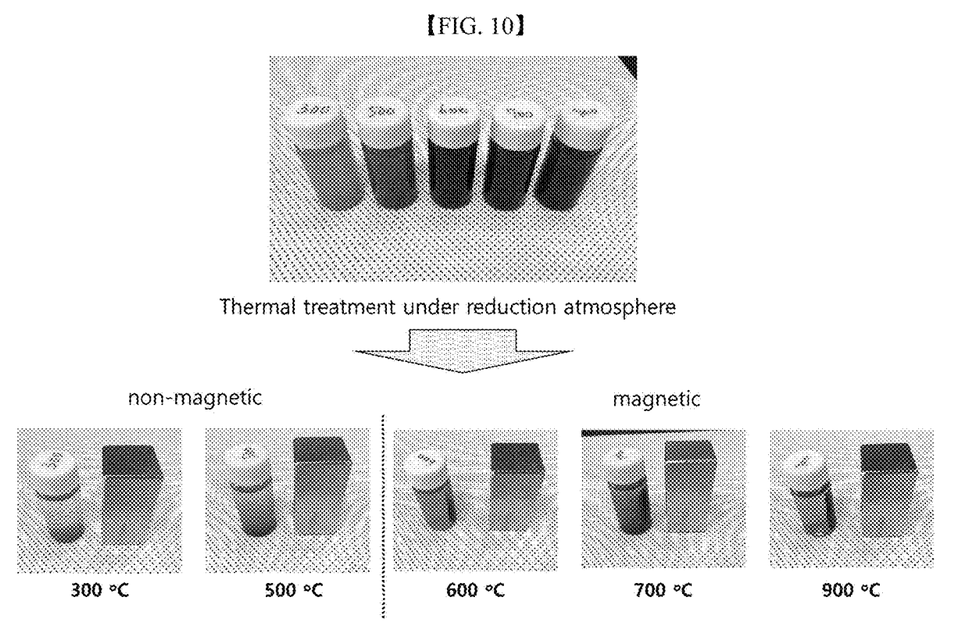
FIG. 10 shows images illustrating magnetic properties of beta-tricalcium phosphate spherical particles including iron as produced by reduction thermal treatments based on various temperatures, in accordance with one embodiment of the present disclosure.

In this connection, the beta-tricalcium phosphate spherical particles containing Fe ions is subjected to the heat treatment at a temperature above 600° C. inclusive, the resulting product may exhibit magnetic property as shown in FIG. 10. In this connection, the thermal treatment may include thermal treatments under a reduction atmosphere and an oxygen atmosphere as described below.

As mentioned above, when the beta-tricalcium phosphate spherical particles containing Fe ions is subject to the heat treatment at a temperature below 600° C., the resulting product may not exhibit magnetic property as shown in FIG. 10. Therefore, to allow the beta-tricalcium phosphate spherical particles containing Fe ions to have the magnetic property, it is essential that the thermal treatment temperature should be above 600° C. inclusive.

Upon determination that the beta-tricalcium phosphate spherical particles containing Fe ions is subjected to the heat treatment at a temperature above 600° C. inclusive, the thermal treatment may be carried out under a reduction atmosphere (S23).

After S23, it may be determined whether the thermal treatment should be terminated (S24).

Upon determination that the thermal treatment is terminated, the beta-tricalcium phosphate spherical particles including the magnetic iron as thermally treated in S23 may be obtained. This product may have the magnetic property.

Otherwise, upon determination that the thermal treatment is not terminated, the process may proceed to S26 where the thermal treatment is executed under an oxygen atmosphere. Then, the thermal treatment may be terminated (S27). Therefore, the beta-tricalcium phosphate spherical particles including the magnetic iron oxide as thermally treated in S26 may be obtained (S28). This product may have the magnetic property.

As described with reference to FIG. 2, magnetic beta-tricalcium phosphate spherical particles having various magnetic properties may be obtained using adjustment of the temperature and atmosphere for the thermal treatment.

Due to thermodynamic characteristics and free energy difference for each bond for a certain material, the bonding state of the material may vary depending on the thermal treatment temperature and atmosphere. In this connection, since the iron is more susceptible to reduction reaction than calcium, the iron phase may be produced in the tricalcium phosphate spherical particles via reduction of iron ions under the reduction atmosphere while the calcium ions maintains the calcium phosphate phase under the reduction atmosphere.

As described above, the beta-tricalcium phosphate containing the magnetic iron may be obtained via the thermal treatment at a temperature of 600° C. or higher under the reduction atmosphere. Further, the beta-tricalcium phosphate containing the magnetic iron as obtained may be subjected to the oxygen atmosphere thermal treatment to obtain the beta-tricalcium phosphate containing the iron oxide such as hematite.

Hereinafter, the present disclosure will be further described with reference to following specific examples. In the following specific examples, iron ions will be employed as an example of the magnetic ions.

EXAMPLE 1

Example 1 relates to the preparation of beta-tricalcium phosphate spherical particles containing iron ions.

Beta-tricalcium phosphate spherical particles with iron ions were prepared by hydrothermal synthesis of mixture of the first and second solutions as described below.

The added iron ions were prepared so that a molar ratio X of Fe to (Fe+Ca) was 0, 0.1, 0.2, 0.3 and 0.5 as shown in Table 1.

TABLE 1

| X = Fe/(Fe + Ca) | Ref 1 | Ref 2 | Ref 3 | Ref 4 | Ref 5 |
|---|---|---|---|---|---|
| molar ratio | 0 | 0.1 | 0.2 | 0.3 | 0.5 |

The first solution was prepared by mixing between 1 g aspartic acid monomer (Asp), calcium chloride and iron chloride in 20 ml de-ionized water. The second solution was prepared by dissolving 0.158 g of ammonium hydrogen phosphate in 15 ml of deionized water. After stirring for 30 minutes, the second solution was added into the first solution to form a mixed solution. A pH of the mixed solution was adjusted to pH 5 using 1M ammonia water to prepare a pH-adjusted mixed solution. This pH-adjusted mixed solution was contained in a Teflon bottle fixed in in a stainless steel iron autoclave, where the solution has been reacted at 200° C. for 12 hours. After cooling the autoclave to room temperature, the luminescent hydroxyapatite was cleansed away using de-ionized water and ethanol. Then, the resulting product was dried in a vacuum oven at 60° C. for 3 hours.

Figure 3:
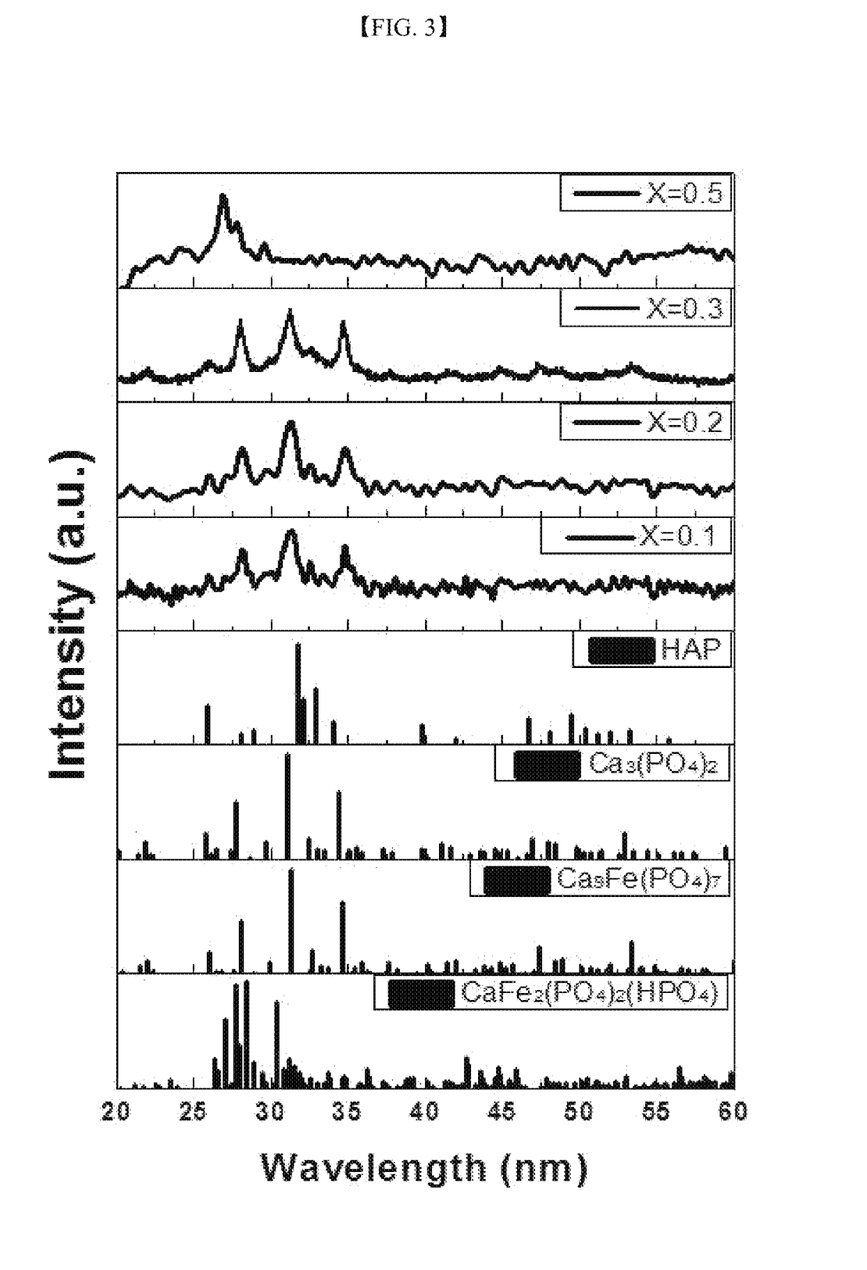
FIG. 3 shows XRD measurements for beta-tricalcium phosphate spherical particles containing Fe ions based on a molar ratio of Fe to (Fe+Ca) therein, as produced in accordance with one embodiment.

The calcium triphosphate spherical particles with the added iron ions thus prepared were subjected to XRD measurement. The measurement result is shown in FIG. 3. With referring to FIG. 3, it was confirmed that beta-tricalcium phosphate was present when the molar ratio X is 0.1, 0.2 and 0.3, while the beta-tricalcium phosphate phase was changed when the molar ratio X is above the range.

SEM photographs of the calcium triphosphate spherical particles with the added iron ions thus prepared in Example 1 are shown in FIG. 4 based on the molar ratio X. FIG. 4 showed that the beta-tricalcium phosphate spherical particles with iron ions were synthesized. Further, it was confirmed that in the case of the spherical particles with the molar ratio X=0.5, the shape of the spherical particle changed from a spherical shape to a rugby ball shape due to changing the phase of the spherical particle.

Figure 5:
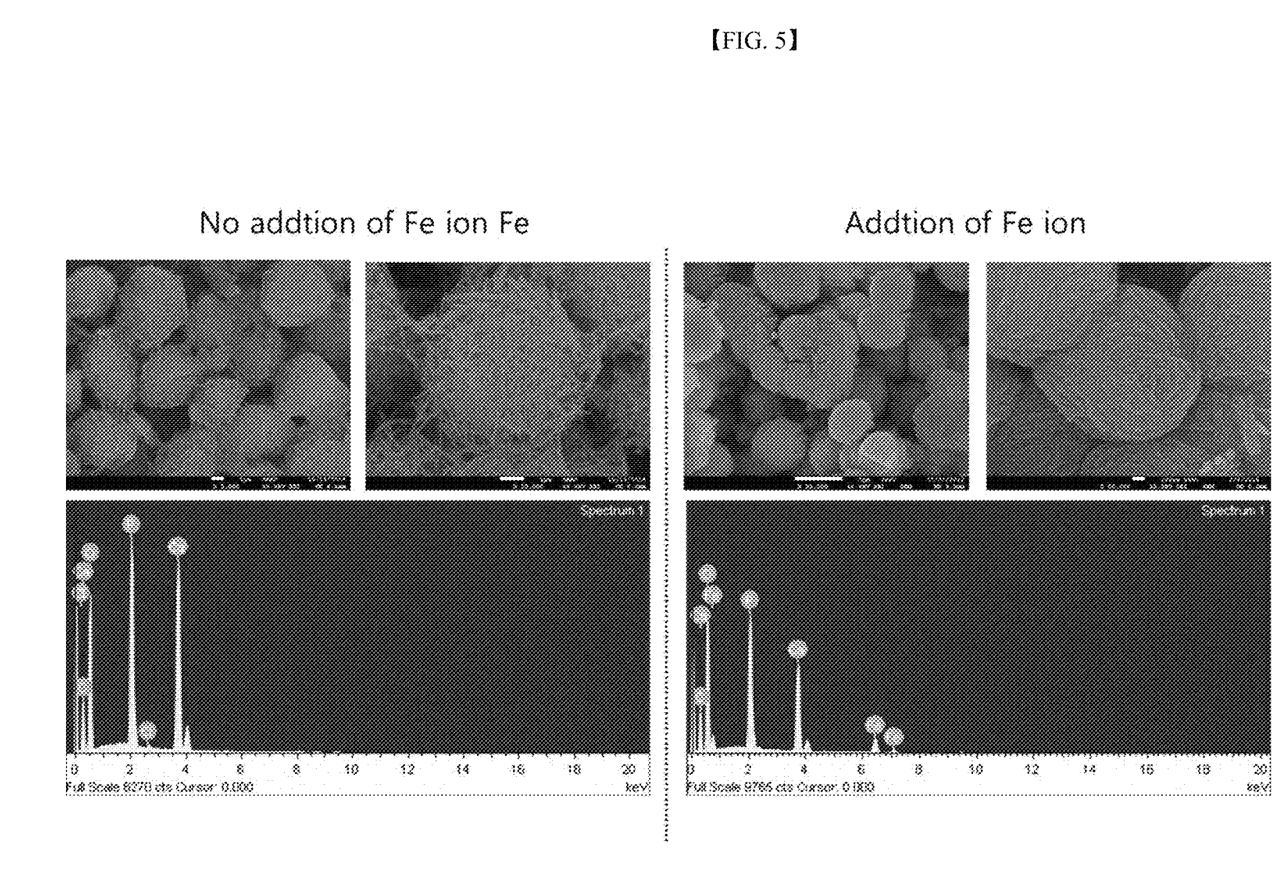
FIG. 5 shows SEM photographs and EDX photographs of beta-tricalcium phosphate spherical particles containing iron ions prepared according to one embodiment of the present disclosure and of beta-tricalcium phosphate spherical particles not containing iron ions prepared for comparison.

In addition, SEM photographs and EDX photographs of beta-tricalcium phosphate spherical particles containing iron ions prepared according to one embodiment of the present disclosure and of beta-tricalcium phosphate spherical particles not containing iron ions prepared for comparison are shown in FIG. 5 respectively. This confirms that iron is present in the present synthesized spherical particles.

Figure 6:
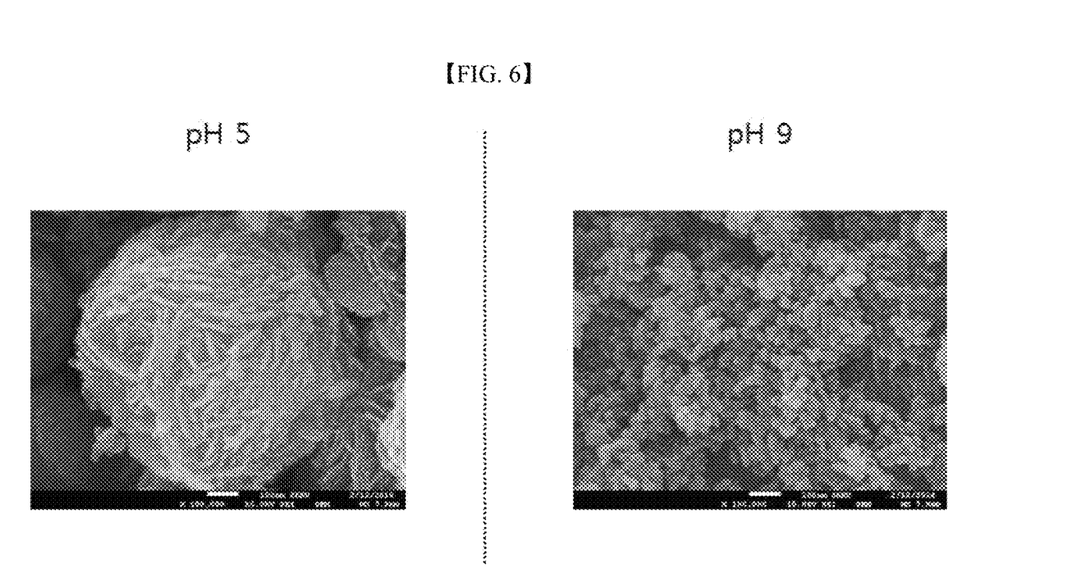
FIG. 6 shows SEM photographs of calcium phosphate spherical particles with iron ions prepared using the hydrothermal synthesis of the mixed solution with pH 5, and of calcium phosphate spherical particles with iron ions prepared using the hydrothermal synthesis of the mixed solution with pH 9, in accordance with one embodiment.

SEM photographs of calcium phosphate spherical particles with iron ions prepared using the hydrothermal synthesis of the mixed solution with pH 5, and of calcium phosphate spherical particles with iron ions prepared using the hydrothermal synthesis of the mixed solution with pH 9 are shown in FIG. 6 respectively. It was confirmed that each of the former particles has 600 to 700 nm diameter, and each of the latter particles has a diameter less than or equal to 50 nm.

EXAMPLE 2

Example 2 relates to the preparation of beta-tricalcium phosphate spherical particles containing magnetic iron or magnetic iron oxide.

In order to change the beta-tricalcium phosphate spherical particles containing iron ions as prepared in the example 1 to the beta-tricalcium phosphate spherical particles containing magnetic iron or magnetic iron oxide, the beta-tricalcium phosphate spherical particles containing iron ions as prepared in the example 1 were subject to reduction thermal treatment for 2 hours at 600° C. under a reducing atmosphere in a tube furnace to form the beta-tricalcium phosphate spherical particles containing magnetic iron.

Further, the beta-tricalcium phosphate spherical particles containing magnetic iron thus prepared were subject to oxidation thermal treatment for 2 hours at 600° C. under an oxygen atmosphere in a tube furnace to form the beta-tricalcium phosphate spherical particles containing magnetic iron oxide.

Figure 7:
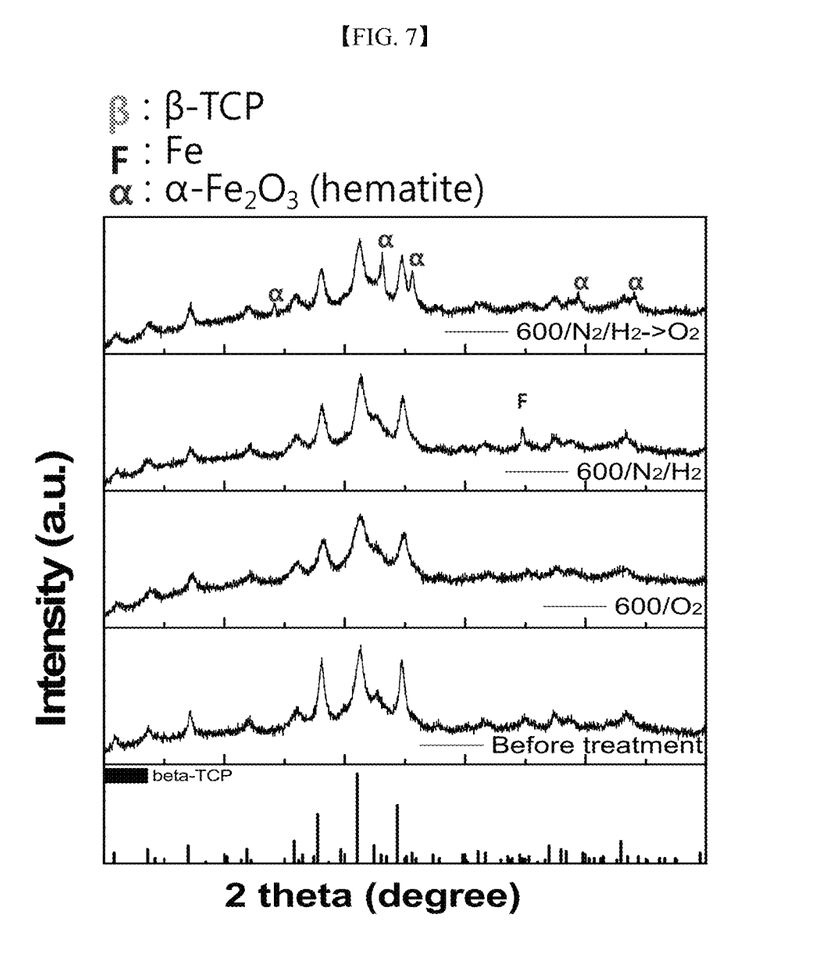
FIG. 7 shows XRD measurement data on beta-tricalcium phosphate spherical particles containing magnetic iron or magnetic iron oxide as provided using different thermal treatment atmospheres, in one embodiment of the present disclosure.

XRD measurement data on the beta-tricalcium phosphate spherical particles containing magnetic iron or magnetic iron oxide as provided in the example 2 of the present disclosure using the different thermal treatment atmospheres are shown in FIG. 7 respectively. In this example 2, as described above, the beta-tricalcium phosphate spherical particles containing iron ions were subject to reduction thermal treatment under a reducing atmosphere and then to oxidation thermal treatment under an oxygen atmosphere. It was confirmed that after the reduction thermal treatment, the product becomes the beta-tricalcium phosphate spherical particles containing magnetic iron. Further, it was confirmed that after the subsequent oxidation treatment, the product becomes the beta-tricalcium phosphate spherical particles containing magnetic iron oxide. In addition, when the oxygen thermal treatment was simply performed without the reduction thermal treatment, it was confirmed that there was no peak of iron or iron oxide particles exhibiting magnetic properties.

Figure 8:
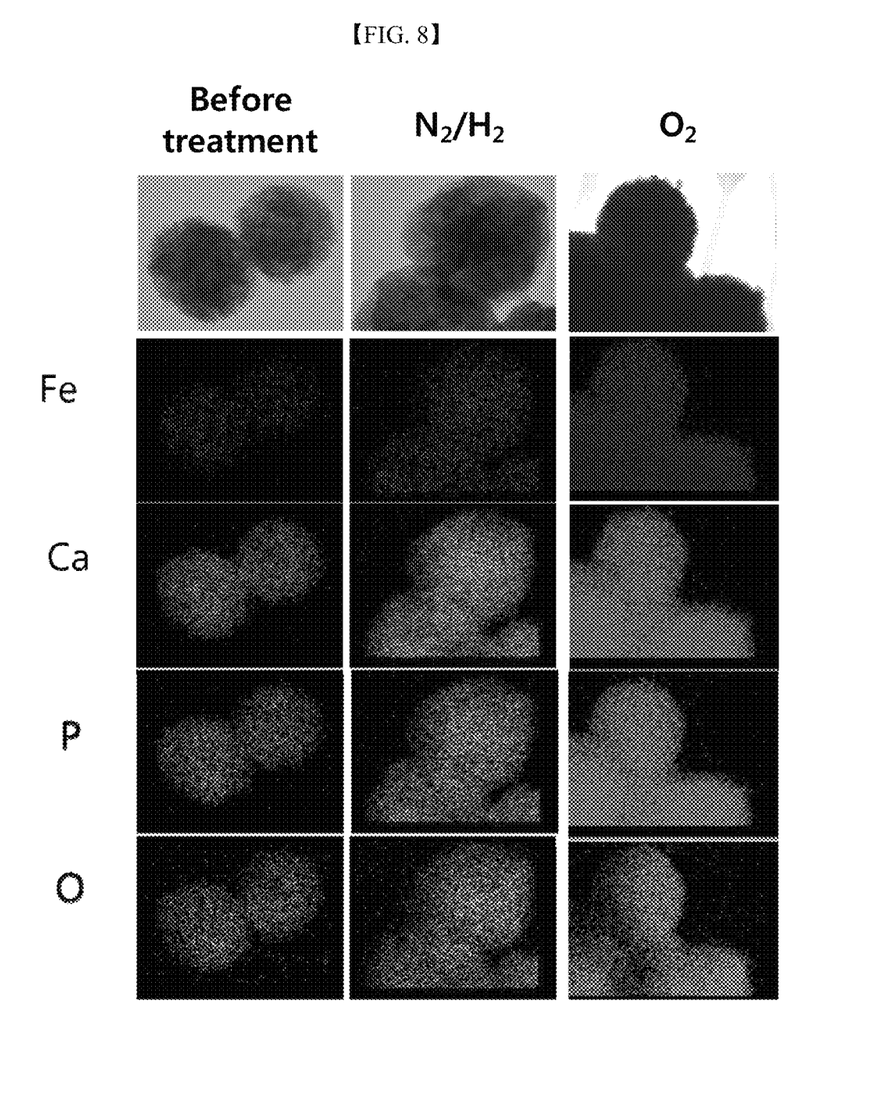
FIG. 8 shows EDX mapping images of Fe, Ca, P, and O elements of beta-tricalcium phosphate spherical particles containing magnetic iron or iron oxide as produced using thermal treatment, in accordance with one embodiment of the present disclosure.

EDX mapping images of Fe, Ca, P, and O elements of the beta-tricalcium phosphate spherical particles containing magnetic iron or iron oxide as produced in the example 2 are shown in FIG. 8. It was confirmed that all spherical particles contain iron.

Figure 9:
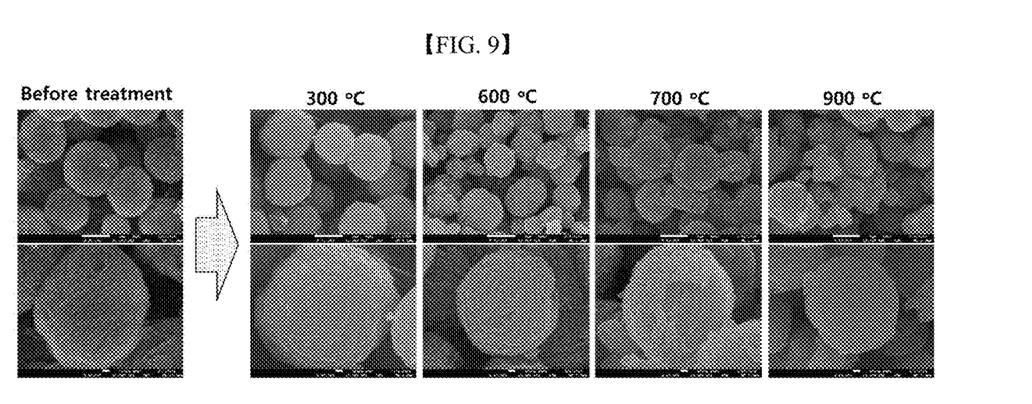
FIG. 9 shows SEM photographs of beta-tricalcium phosphate spherical particles including magnetic iron as produced by reduction thermal treatments at various temperatures, for example, 300° C., 600° C., 700° C., and 900° C., in accordance with one embodiment of the present disclosure.

SEM photographs of the beta-tricalcium phosphate spherical particles including the magnetic iron as produced by the reduction thermal treatments according to the example 2 at various temperatures, for example, 300° C., 600° C., 700° C., and 900° C. are shown in FIG. 9 respectively. It was confirmed that sintering occurred as the thermal treatment temperature increased.

Images illustrating the magnetic properties of the beta-tricalcium phosphate spherical particles including iron as produced by the reduction thermal treatments according to the example 2 based on various temperatures are shown in FIG. 10. It was confirmed that the spherical particles subjected to the reduction thermal treatment above 600° C. inclusive exhibit the magnetic properties, whereas the spherical particles subjected to the reduction thermal treatment below 600° C. do not exhibit the magnetic properties.

Figure 11:
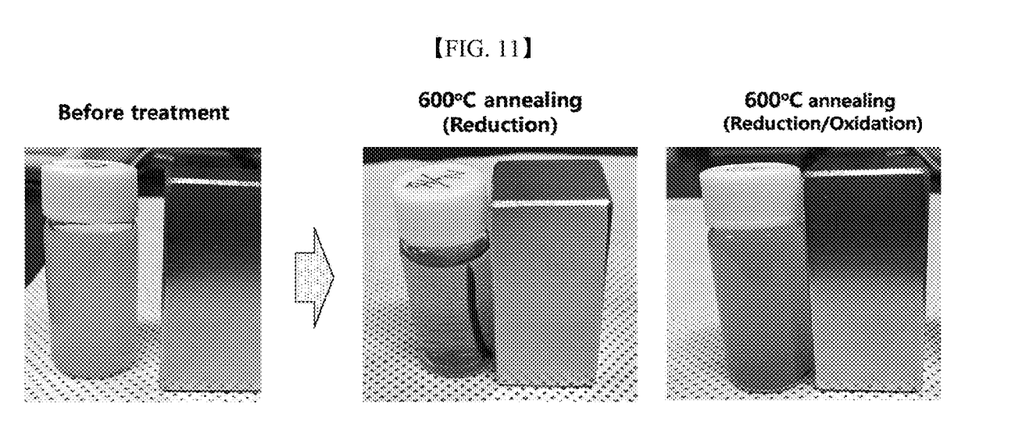
FIG. 11 shows images of magnetic properties of beta-tricalcium phosphate spherical particles including iron or iron oxide subjected to only reduction treatment or reduction and subsequent oxygen thermal treatments, in accordance with one embodiment of the present disclosure.

Images of the magnetic properties of beta-tricalcium phosphate spherical particles including iron or iron oxide subjected to only reduction treatment or reduction and subsequent oxygen thermal treatments according to example 2 of the present disclosure are shown in FIG. 11 respectively. This confirms that the resulting beta-tricalcium phosphate including iron or iron oxide are magnetic. As shown in FIG. 11, it may be seen that the reduction thermal treatment at the temperature below 600° C. does not result in the magnetic property of the product (left figure). In case of reduction thermal treatment at the temperature above 600° C. inclusive, the resulting particles were magnetic and thus aligned to the magnet (middle figure). When the oxygen atmosphere thermal treatment was performed after the reduction thermal treatment, it was confirmed that the resulting particles show red and are aligned to the magnet at the same time (right figure).

The above description is not to be taken in a limiting sense, but is made merely for the purpose of describing the general principles of exemplary embodiments, and many additional embodiments of this disclosure are possible. It is understood that no limitation of the scope of the disclosure is thereby intended. The scope of the disclosure should be determined with reference to the Claims. Reference throughout this specification to "one embodiment," "an embodiment," or similar language means that a particular feature, structure, or characteristic that is described in connection with the embodiment is included in at least one embodiment of the present disclosure. Thus, appearances of the phrases "in one embodiment," "in an embodiment," and similar language throughout this specification may, but do not necessarily, all refer to the same embodiment.

The invention claimed is:

1. A method for producing beta-tricalcium phosphate spherical particles containing magnetic ions, the method comprising:
   mixing acidic amino acid monomers, metal salt of the magnetic ions and metal salt of calcium ions in de-ionized water to form a first solution;
   dissolve phosphate in de-ionized water to form a second solution;
   mixing the first and second solutions to form a third solution; and
   performing hydrothermal synthesis of the third solution.

2. The method of claim 1, wherein amino acid in the acidic amino acid monomer includes at least one selected from a group consisting of aspartic acid and glutamic acid.

3. The method of claim 1, further comprising adjusting a pH of the third solution, wherein the adjusted pH thereof is in a range of 4 to 8.

4. The method of claim 1, wherein the hydrothermal synthesis is carried out at a temperature of 100 to 230° C. for 6 to 24 hours.

5. The method of claim 1, wherein the magnetic ions are selected from Fe, Co, or Ni ions.

6. The method of claim 1, wherein the magnetic ions are Fe ions, and a molar ratio of Fe to (Fe+Ca) in the third solution is in a range of 0.1 to 0.3, and the metal salt of Fe ions includes at least one selected from a group consisting of $FeCl_2$, $FeCl_3$, $Fe(NO_3)_2$, $Fe(NO_3)_3$, $Fe(OH)_2$ and $Fe(OH)_3$.

7. The method of claim 1, wherein the metal salt of calcium ions includes at least one selected from $Ca(NO_3)_2$, $CaCl_2$, $Ca(OH)_2$ and $(Ca(CH_3CO_2)_2$.

8. The method of claim 1, wherein the phosphate includes at least one selected from $H_3PO_4$, $NaH_2PO_4$, $Na_2HPO_4$, $KH_2PO_4$, $K_2HPO_4$, $(NH_4)H_2PO_4$ and $(NH_4)_2HPO_4$.

9. A method for producing beta-tricalcium phosphate spherical particles being magnetic, the method comprising:
   mixing acidic amino acid monomers, metal salt of magnetic ions and metal salt of calcium ions in de-ionized water to form a first solution;
   dissolve phosphate in de-ionized water to form a second solution;
   mixing the first and second solutions to form a third solution;
   performing hydrothermal synthesis of the third solution to form beta-tricalcium phosphate spherical particles containing magnetic ions; and
   performing thermal treatment of the beta-tricalcium phosphate spherical particles containing magnetic ions.

10. The method of claim 9, wherein the thermal treatment is performed at a temperature above 600° C. inclusive under a reduction atmosphere.

11. The method of claim 9, wherein the thermal treatment includes first and subsequent second thermal treatments, wherein the first thermal treatment is performed at a temperature above 600° C. inclusive under a reduction atmosphere, wherein the second treatment is performed under an oxygen atmosphere.

12. The method of claim 9, wherein amino acid in the acidic amino acid monomer includes at least one selected from a group consisting of aspartic acid and glutamic acid.

13. The method of claim 9, further comprising adjusting a pH of the third solution, wherein the adjusted pH thereof is in a range of 4 to 8.

14. The method of claim 9, wherein the hydrothermal synthesis is carried out at a temperature of 100 to 230° C. for 6 to 24 hours.

15. The method of claim 9, wherein the magnetic ions are selected from Fe, Co, or Ni ions.

16. The method of claim 15, wherein the magnetic ions are Fe ions, and a molar ratio of Fe to (Fe+Ca) in the third solution is in a range of 0.1 to 0.3.

17. The method of claim 16, wherein the metal salt of Fe ions includes at least one selected from a group consisting of $FeCl_2$, $FeCl_3$, $Fe(NO_3)_2$, $Fe(NO_3)_3$, $Fe(OH)_2$ and $Fe(OH)_3$.

18. The method of claim 9, wherein the metal salt of calcium ions includes at least one selected from $Ca(NO_3)_2$, $CaCl_2$, $Ca(OH)_2$ and $(Ca(CH_3CO_2)_2$.

19. The method of claim 9, wherein the phosphate includes at least one selected from $H_3PO_4$, $NaH_2PO_4$, $Na_2HPO_4$, $KH_2PO_4$, $K_2HPO_4$, $(NH_4)H_2PO_4$ and $(NH_4)_2HPO_4$.

* * * * *